United States Patent
Howard et al.

(10) Patent No.: US 6,460,143 B1
(45) Date of Patent: Oct. 1, 2002

(54) APPARATUS AND METHOD FOR AWAKENING BUS CIRCUITRY FROM A LOW POWER STATE

(75) Inventors: Brian D. Howard, Portola Valley; Michael F. Culbert, San Jose; Robert Bailey, La Selva Beach, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/340,762

(22) Filed: Jun. 28, 1999

Related U.S. Application Data
(60) Provisional application No. 60/133,917, filed on May 13, 1999.

(51) Int. Cl.[7] .................................. G06F 1/26
(52) U.S. Cl. ........................................ 713/323
(58) Field of Search ....................... 710/301, 302; 713/320, 323, 324

(56) References Cited

U.S. PATENT DOCUMENTS

| | | | |
|---|---|---|---|
| 5,557,777 A | | 9/1996 | Culbert |
| 5,600,841 A | | 2/1997 | Culbert |
| 5,708,816 A | | 1/1998 | Culbert |
| 5,812,796 A | * | 9/1998 | Broedner et al. ............ 710/260 |
| 6,119,194 A | * | 9/2000 | Miranda et al. ............ 710/306 |
| 6,230,277 B1 | * | 5/2001 | Nakaoka et al. ............ 713/310 |
| 6,308,278 B1 | * | 10/2001 | Khouli et al. ............... 713/323 |

OTHER PUBLICATIONS

"Universal Serial Bus Specification", Revision 1.0, Jan. 15, 1996.

* cited by examiner

Primary Examiner—Glenn A. Auve
(74) Attorney, Agent, or Firm—Beyer Weaver & Thomas, LLP

(57) ABSTRACT

Apparatus and techniques for awakening bus circuitry from an inactive state as needed are described. The bus circuitry forms part of a computer system and is placed in the inactive state (i.e., shut down) when not needed so as to conserve power. The bus circuitry is associated with a bus and can be awakened out of the inactive state when certain bus events, including resume, connect or disconnect, occur on the bus. The invention is particularly advantageous for computing devices (e.g., portable computers, desktop computers, server computers) where it is desirous to shut down bus circuitry as well as other circuitry (e.g., microprocessor) when not needed so as to reduce power consumption.

27 Claims, 10 Drawing Sheets

APPARATUS AND METHOD FOR AWAKENING BUS CIRCUITRY FROM A LOW POWER STATE

CROSS-REFERENCE TO RELATED APPLICATION

This application claims the benefit of U.S. Provisional application No.: 60/133,917 filed May 13, 1999, and entitled "APPARATUS AND METHOD FOR AWAKENING BUS CIRCUITRY FROM A LOW POWER STATE", the content of which is hereby incorporated by reference.

BACKGROUND OF THE INVENTION

1. Field of the Invention

The present invention relates to computer systems and, more particularly, to bus control for computer systems.

2. Description of the Related Art

Computer systems typically include a bus over which data and control signals are exchanged with peripheral devices. These buses are often categorized as either parallel buses or serial buses. Parallel buses include multiple data lines, whereas serial buses include a single data line (or a differential pair of lines). Examples of parallel buses are Interface Standard Association (ISA) and Peripheral Component Interface (PCI). Examples of serial buses are Apple Desktop Bus (ADB), Access.bus, IEEE P1394, Concentration Highway Interface (CHI), and GeoPort.

Recently, a serial bus known as Universal Serial Bus (USB) has been developed. USB is an industry standard extension to the personal computer architecture with a focus on Computer Telephony Integration (CTI), consumer and productivity applications. The USB is described in a Universal Serial Bus Specification, Revision 1.0, dated Jan. 15, 1996, which is hereby incorporated by reference.

USB is a cable bus that supports data exchange between a host computer and a wide range of simultaneously accessible peripherals. The USB bus is a four wire bus, with a power line (Vbus), a ground line (GND), and two data lines (VD+ and VD−). Data is transmitted over the data lines in a differential manner. The peripherals attached to a USB share the bandwidth of the USB through a host scheduled token based protocol. The USB specification allows peripherals to be attached, configured, used and detached while the host and other peripherals are in operation. Such is often referred to as dynamic (or hot) attachment and removal.

A USB bus connects USB devices with a USB host. A host controller interfaces the USB bus to the host computer system. The host controller may be implemented in a combination of hardware, firmware or software. The USB host interacts with the USB devices through the host controller. The host and its associated host controller are responsible for managing the use of the USB. Specifically, the host is responsible for detecting the attachment and removal of USB devices, managing control flow between the host and USB devices, managing data flow between the host and USB devices, collecting status and activity statistics, and providing a limited amount of power to attached USB devices.

USB devices are peripheral devices that add additional functionality to the host computer. The types of functionality provided by the USB devices varies widely. To assist the USB host in identifying and configuring USB devices, each USB device carries and reports configuration related information. Some of the information reported is common to all logical devices, while other information is specific to the functionality provided by the device. Before a peripheral device can be used, it must be configured by the host. This configuration includes allocating USB bandwidth and selecting function specific configuration options. Examples of functions provided by peripheral devices include: locator devices such as a mouse, tablet, or light pen; input devices such as a keyboard; output devices such as a printer or scanner; and telephony adapters such as an ISDN adapter.

The USB specification also covers power management aspects. Each USB segment provides a limited amount of power over the cable. The host supplies power for use by USB devices that are directly connected to the host. In addition, any USB device may have its own power supply. USB devices that rely totally on the power from the cable are called bus-powered devices. In contrast, those USB devices that have an alternate source of power are called self-powered devices.

A USB host has a power management system which is independent from that of USB. The USB system software interacts with the host's power management system to handle system power events such as Suspend or Resume. In particular, USB allows the host computer to command connected USB devices to enter a low-power Suspend state. A suspended full-speed device pulls the VD+ data line high, while the host's pull-down resistor to ground pulls the VD− data line low. Similarly, a suspended low-speed device pulls the VD− line high, while the host's pull-down resistor to ground pulls the USB VD+ data line low. The state of the USB bus when a suspended device is connected is also called the Idle state. When a suspended device experiences a wakeup event (such as a key press, modem ring detect, etc.), it generates a Resume event by driving the low data line high and driving the high data line low. Normally, the host computer's USB circuitry detects the Resume event, and resumes normal USB communication with the device.

When a device is unplugged from a USB port, the host computer's pull-down resistors cause both data lines to be pulled low. The host computer's USB circuitry detects this as a disconnect event. If a device is later plugged into the port, the device pulls one of the data lines high. The particular one of the data lines pulled high depends on whether it is a full-speed or a low-speed device. The host computer's USB circuitry detects this connect event, and begins USB communication with the device.

However, all of these operations require the host computer's USB circuitry to be awake (powered and clocked) at all times, in order to detect resume, disconnect or connect events. In many cases, especially in portable computers or other battery-powered devices, it is desirable to shut down the USB circuitry (stop its clocks and possibly turn off its power) when it is not needed so as to reduce the host computer's power consumption. For example, this might occur when the host computer is in a sleep state, or when no USB devices are presently connected to the host computer. Although such power management advantageously reduces power consumption and thus extends battery life, a serious problem is presented because these bus events (resume, connect and disconnect) are not able to be detected when the host computer's USB circuitry has been shut down. This problem leads to improper operation of the host computer, namely, unresponsiveness to bus events, and thus user dissatisfaction.

Thus, there is a need for improved bus control such that peripheral devices can utilize a bus even though the host bus circuitry for the bus is shut down for power management.

SUMMARY OF THE INVENTION

Broadly speaking, the invention relates to apparatus and techniques for awakening bus circuitry from an inactive state as needed. The bus circuitry forms part of a computer system and is placed in the inactive state (i.e., shut down) when not needed so as to conserve power. The bus circuitry is associated with a bus and can be awakened out of the inactive state when certain bus events, including resume, connect or disconnect, occur on the bus. The invention is particularly advantageous for battery-powered computing devices (e.g., portable computers) where it is desirous to shut down bus circuitry as well as other circuitry (e.g., microprocessor) when not needed so as to reduce power consumption.

The invention can be implemented in numerous ways, including as a system, a device, an apparatus, and a method. Several embodiments of the invention are summarized below.

As a computer system, one embodiment of the invention includes: a memory for storing at least instructions; a microprocessor for processing the instructions stored in the memory, the microprocessor having an active state and a sleep state; a peripheral bus; a bus host controller for managing data transfer over the peripheral bus, the bus host controller having an operational mode and a shut-down mode, the shut-down mode providing power savings; and a wakeup circuit operatively connected to the peripheral bus, the wakeup circuit operates to detect bus events on the peripheral bus when the bus host controller is in the shut-down mode and to initiate awakening of the host bus controller to the operational mode when bus events have been detected.

As a computer system, another embodiment of the invention includes: a memory for storing at least instructions; a microprocessor for processing the instructions stored in the memory; a power manager for managing power consumption of the computer system; a peripheral bus; a bus host controller for managing data transfer over the peripheral bus, the bus host controller being shut-down when the peripheral bus is not needed; and a wakeup circuit operatively connected to the peripheral bus, the wakeup circuit operates to detect bus events on the peripheral bus when the bus host controller is shutdown and to initiate awakening of the host bus controller when bus events have been detected.

As a wakeup circuit for awakening a bus controller from a low-power mode, where the bus controller controls communications with a bus, an embodiment of the invention includes: an initial bus condition store that stores initial conditions residing on the bus when the wakeup circuit is activated; and event detection circuitry that detects at least one type of bus event on the bus based on current bus conditions and the initial conditions stored in the initial bus condition store.

As a wakeup circuit for awakening a bus controller from a low-power mode, where the bus controller controls communications with a bus, another embodiment of the invention includes: event detection circuitry that detects at least one type of bus event on the bus based on current bus conditions; and a wakeup signal generator that operates to produce a bus wakeup signal that is used in awakening the bus controller.

As a method for monitoring bus activity on a bus of a computing device when a bus controller for the bus is inactive, an embodiment of the invention includes the operations of: activating a bus monitor circuit when the bus controller becomes inactive; saving an initial bus state when the bus monitor circuit is activated; subsequently monitoring a current bus state of the bus using the bus monitor circuit to detect certain bus events occurring on the bus, the certain bus events being detected based on the initial bus state and the current bus state; and awakening the bus controller when at least one of the certain bus events are detected.

The advantages of the invention are numerous. Different embodiments or implementations may have one or more of the following advantages. One advantage of the invention is that bus events invoked on a bus by a peripheral device are able to be noticed and responded to even though bus circuitry is shut down (i.e., inactive state). Another advantage of the invention is that power management can be had for bus circuitry without loss of important bus events while the bus circuitry is shut down. Still another advantage of the invention is that resistance to noise present on the bus is provided so that bus events are not erroneously detected. Yet another advantage of the invention is that the particular type of event inducing the awakening of the bus circuitry can be made known to the computer system (e.g., operating system).

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to apparatus and techniques for awakening bus circuitry from an inactive state as needed. The bus circuitry forms part of a computer system and is placed in the inactive state (i.e., shut down) when not needed so as to conserve power. The bus circuitry is associated with a bus and can be awakened out of the inactive state when certain bus events, including resume, connect or disconnect, occur on the bus. The invention is preferably implemented as an electrical circuit, which can be a separate circuit or integrated within the bus circuitry. The invention is particularly advantageous for battery-powered computing devices (e.g., portable computers) where it is desirous to shut down bus circuitry as well as other circuitry (e.g., microprocessor) when not needed so as to reduce power consumption.

Embodiments of the invention are discussed below with reference to FIGS. 1–9. However, those skilled in the art will readily appreciate that the detailed description given herein with respect to these figures is for explanatory purposes as the invention extends beyond these limited embodiments.

Figure 1:
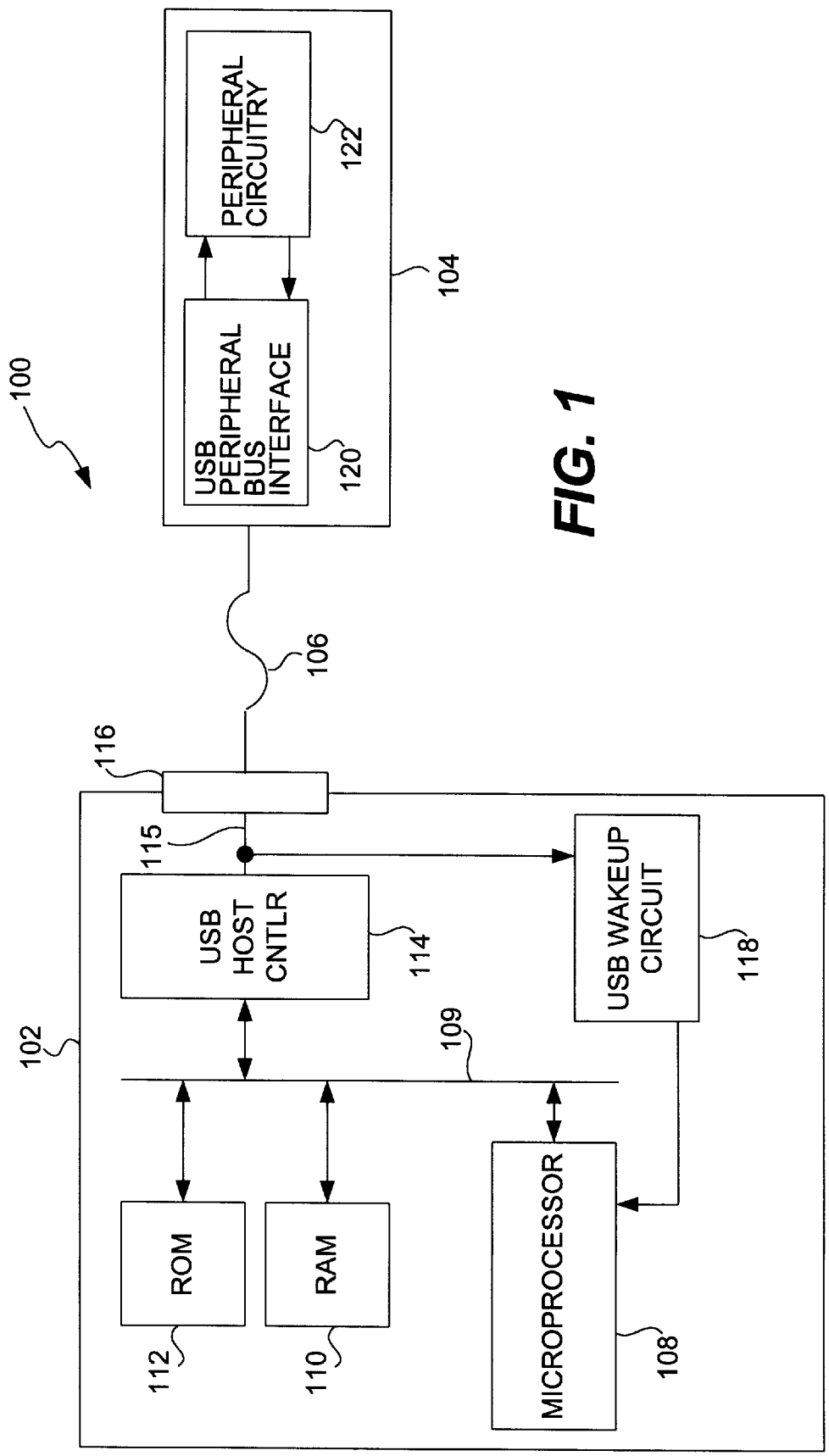
FIG. 1 is a block diagram of a computer system according to one embodiment of the invention.

FIG. 1 is a block diagram of a computer system 100 according to one embodiment of the invention. The computer system 100 includes a computer 102 that couples to a peripheral device 104 via a USB bus 106. The computer 102 includes a microprocessor 108 that executes instructions to carry out operations for the computer 102. The microprocessor 108 couples to a system bus 109. Also coupled to the system bus 109 is a random-access memory (RAM) 110, a read-only memory (ROM) 112, and a USB host controller 114. The RAM 110 provides temporary data storage for use by at least the microprocessor 108. The ROM 112 typically stores programming instructions for use with the microprocessor 108 (including at least a portion of an operating system). The USB host controller 114 operates to manage the USB bus 106 in accordance with the USB specification. More particularly, the USB host controller 114 is used to transmit and receive data over the USB bus 106.

The computer 102 also includes a USB port 116 and a USB wakeup circuit 118. The USB port 1 16 is used to couple an internal link 115 of the USB bus 106 from the USB host controller 114 to a cable carrying the USB bus 106. According to the USB specification, the cable for the USB bus 106 includes four wires, two of which carry power supply signals and the other two carry differential data. The USB wakeup circuit 118 is coupled to the internal link 115 of the USB bus 106 so that bus events occurring on the USB bus 106 by the peripheral device 104 (or other peripheral devices) can be detected when the USB host controller is shut down. In other words, when the USB host controller 114 shuts down, typically for power conservation reasons, the USB wakeup circuit 188 is activated to monitor the USB bus 106 for certain bus events that should be serviced. When such of the certain bus events have been detected, the USB wakeup circuit 118 causes the USB host controller 114 to awaken. In one embodiment, the USB wakeup circuit 118 notifies the microprocessor 108, and then the microprocessor 108 together with an operating system (residing in ROM 112 or the RAM 110) causes the USB host controller 114 to be awakened. Once awakened, the USB host controller 114 is able to service the detected bus events.

The peripheral device 104 includes a USB peripheral bus interface 120 that couples to the cable carrying the USB bus 106. The USB peripheral bus interface 120 interacts with the USB host controller 114 to facilitate the transfer and reception of data over the USB bus 106. The peripheral device 104 also includes peripheral circuitry 122. The peripheral circuitry 122 performs a variety of difference operations depending on the type of the peripheral device 104. As examples, the peripheral device 104 could be a keyboard, a monitor, a modem, a camera, a scanner, etc.

Figure 2:
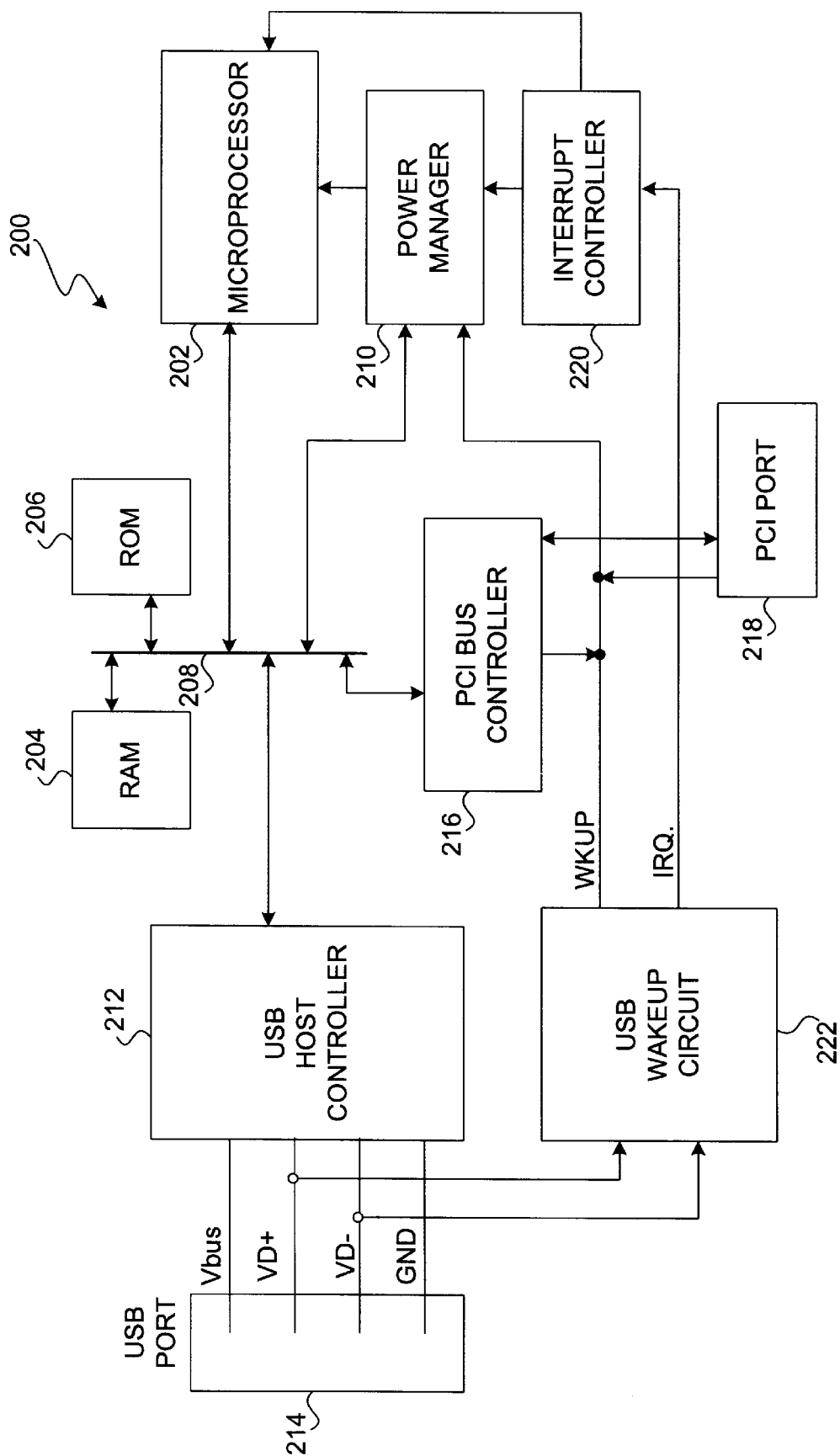
FIG. 2 is a block diagram of a computer system according to another embodiment of the invention.

FIG. 2 is a block diagram of a computer system 200 according to another embodiment of the invention. The computer system 200 includes a microprocessor 202, a random access memory (RAM) 204, and a read-only memory (ROM) 206. The RAM 204 and the ROM 206 are coupled to the microprocessor 202 through a system bus 208. The microprocessor 202 executes instructions to carry out operations for the computer system 200. The RAM 204 provides temporary data storage for use by at least the microprocessor 108. The ROM 206 typically stores programming instructions for use with the microprocessor 202. An operating system (or at least a portion thereof) is normally stored in the RAM 204 or the ROM 206. The computer system 200 also includes a power manager 210 that manages power consumption by the computer system 200. The power manager works with the operating system in managing the power consumption of the computer system 200. The power manager 210 can be used to power manage various components of the computer system 200, including the microprocessor 202, various bus controllers, and other subsystems within the computer system 200. The computer system 200 could also be a multiprocessor system in which case the power manager 210 could power manage a plurality of microprocessors.

Still further, the computer system 200 includes a USB host controller 212 that controls interaction with a USB bus that couples to a USB port 214. The USB bus is a serial bus that is able to support one or more peripheral devices that desire to communicate with the computer system 200. The USB bus is a four wire bus, with a power line (Vbus), a ground line (GND), and two data lines (VD+ and VD−). Data is transmitted over the data lines in a differential manner. Besides the USB bus, the computer system 200 also supports a PCI bus. The PCI bus is supported by a PCI bus controller 216 and the PCI bus couples to a PCI port 218 of the computer system 200. The USB host controller 212 and the PCI bus controller 216 are coupled to the system bus 208 of the computer system 200. The computer system 200 also includes an interrupt controller 220 that, when needed, supplies interrupt requests to the microprocessor 202. The interrupt controller 220 can also supply an interrupt request to the power manager 210 in cases where the computer system 200 is in a shutdown state (or sleep mode).

The operating system (or other software) controls the overall power consumption of the computer system 220 and uses the power manager 210 (hardware) to perform some of the shutdown operations such as stopping clocks, stopping power, and interrupt handling. In this regard, the operating system or the power manager 210 can place various components in a shutdown state (or sleep mode) so as to conserve power. Namely, the microprocessor 202 can be placed in a sleep mode when its processing capabilities are not needed. The operating system or the power manager 210 can also place the USB host controller 212 (or the PCI bus controller 216) in an inactive state (i.e., shut down) or awaken the USB host controller 212 (or the PCI bus controller 216) from the inactive state to the active state. In one embodiment, when the computer system 200 is to be awakened, the power manager 210 can awaken other parts of the computer system 200 (e.g., the microprocessor 202) and thereafter the operating system (or other software) can activate the USB host controller 212. Alternatively, the power manager 210 could activate the USB host controller 212 as the computer system 200 is being awakened.

Unfortunately, when the USB host controller 212 is in the inactive state, events occurring on the USB bus are not able to be detected by the USB host controller 212. As a result, the computer system 200 is not able to utilize the USB bus when the USB host controller 212 is in the inactive state. This is problematic because often peripheral devices on the USB bus desire to initiate communications with the USB host controller 212, and are conventionally unable to do so.

However, to conserve power, it is desirable to retain the USB host controller 212 in the inactive state so as to conserve power when there is no activity on the USB bus, when the computer system 200 is in the shutdown state (or sleep mode), or when no USB devices are connected to the USB bus.

To allow the use of the USB bus even when the USB host controller 212 is in the inactive state, the computer system 200 further includes a USB wakeup circuit 222. The USB wakeup circuit 222 couples to the differential data lines of the USB bus and monitors activity on these differential data lines to detect bus events that should wakeup the USB host controller 212 (as well as perhaps the microprocessor 202 if sleeping). When the USB wakeup circuit 222 detects such a bus event on the differential data lines, the USB wakeup circuit 222 causes the USB host controller 212 to awaken for servicing the detected bus event. When the computer system 200 (including the microprocessor 202) is also in the shutdown state (or sleep mode), the USB wakeup circuit 222 can also cause the computer system 200 to wakeup from its sleep mode (often prior to awakening the USB host controller 212).

In one embodiment, the USB wakeup circuit 222 issues either a wakeup interrupt signal to the interrupt controller 220 or a wakeup signal to the power manager 210. The wakeup signal is used when the computer system 200 is in the shutdown state and operates to tell the power manager 210 to wakeup the computer system 200 (including the microprocessor 202) and then the operating system (or other software) can awaken the USB host controller 212. When the microprocessor 202 is already in an active mode, the wakeup interrupt signal is supplied to the interrupt controller 220 which will interrupt the microprocessor 202 to initiate software that awakens the USB host controller 212 and services the bus event.

Figure 3:
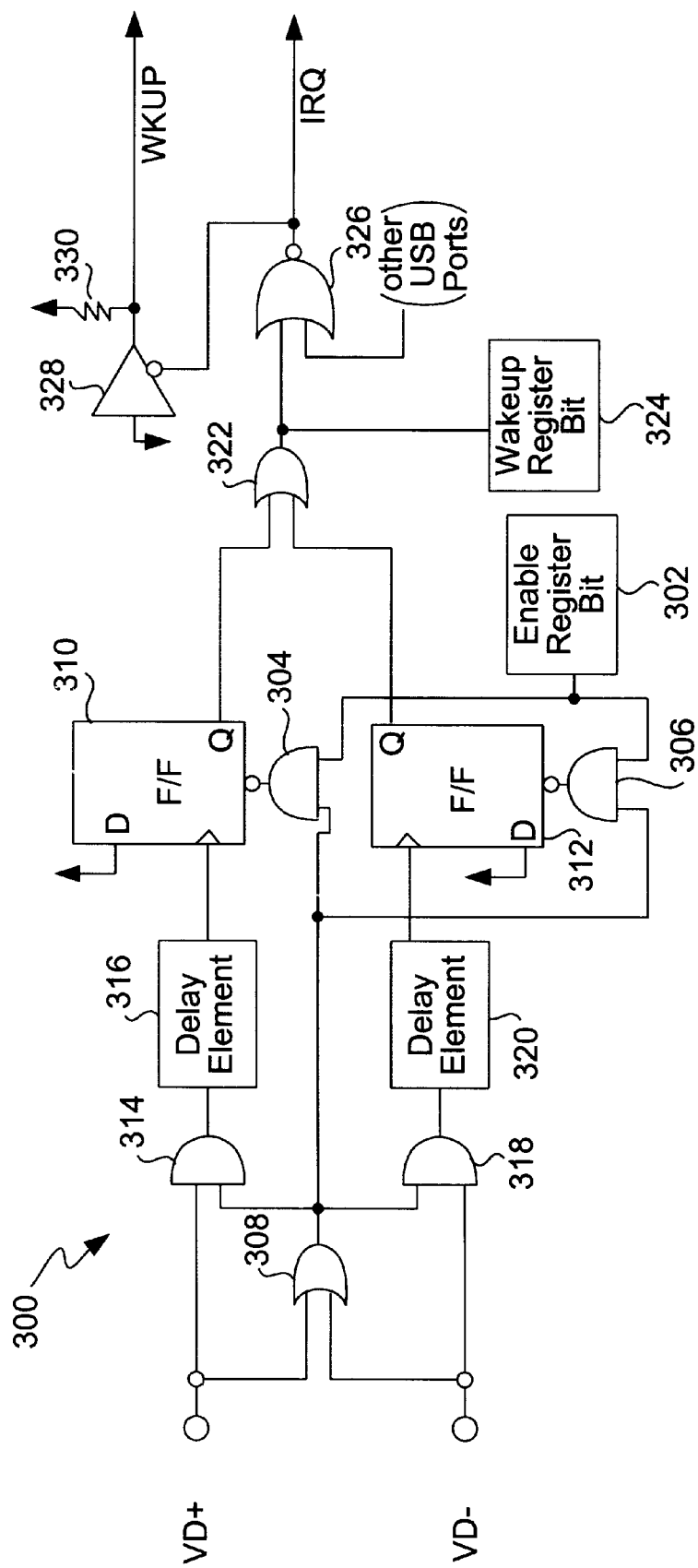
FIG. 3 is a schematic diagram of a bus wakeup circuit according to one embodiment of the invention.

FIG. 3 is a schematic diagram of a bus wakeup circuit 300 according to one embodiment of the invention. The bus wakeup circuit 300 is, for example, suitable for use as the USB wakeup circuit 118 illustrated in FIG. 1 or the USB wakeup circuit 222 illustrated in FIG. 2.

The bus wakeup circuit 300 is activated by an enable register bit 302. In particular, when a "1" bit has been set in the enable register bit 302, the bus wakeup circuit 300 is activated (or enabled). Software has access to the enable register bit 302 to enable or disable the bus wakeup circuit 300. An enable signal provided by the enable register bit 302 is supplied to AND gates 304 and 306. Another input to the AND gates 304 and 306 is provided by the output from OR gate 308. The OR gate 308 logically ORs the differential data lines VD+ and VD− of the peripheral bus (e.g., USB bus). The outputs of the AND gates 304 and 306 are respectively supplied to reset terminals (or clear terminals) of flip-flops 310 and 312. When the outputs of the AND gates 304 and 306 are HIGH (i.e., "1"), the flip-flops 310 and 312 are enabled, and when the outputs of the AND gates 304 and 306 are LOW (i.e., "0"), the flip-flops 310 and 312 are reset (or cleared) and thus disabled. Each of the flip-flops 310 and 312 also include a data terminal (D) that is coupled to a positive voltage source. The flip-flops 310 and 312 also include a clock terminal and an output terminal (Q). A clock signal for the clock terminal of the flip-flop 310 is provided by AND gate 314 and delay element 316. The AND gate 314 receives as inputs the positive data line (VD+) and the output from the OR gate 308. The output from the AND gate 314 is then delayed by the delay element 316 to yield the clock signal being supplied to the clock terminal of the flip-flop 310. A clock signal for the clock terminal of the flip-flop 312 is provided by AND gate 318 and delay element 320. The AND gate 318 receives as inputs the negative data line (VD−) and the output from the OR gate 308. The output from the AND gate 318 is then delayed by the delay element 320 to yield the clock signal being supplied to the clock terminal of the flip-flop 312.

The bus wakeup circuit 300 also includes an OR gate 322 that receives the output signals from the output terminals of the flip-flops 310 and 312. The output of the OR gate 322 indicates whether the bus wakeup circuit 300 has detected an event on the particular bus port being monitored. More particularly, when the output of the OR gate 322 is HIGH, bus wakeup is requested; whereas, when the output of the OR gate 322 is LOW, bus wakeup is not requested. A wakeup register bit 324 can be coupled to the output of the OR gate 322 to provide a software access point to the output from the OR gate 322, namely, a bit indicating whether or not a wakeup request is being made. A microprocessor or software (e.g., operating system) can then access the wakeup register bit 324 to determine whether the particular bus associated with the bus wakeup circuit 300 is requesting the wakeup. The microprocessor or software can also clear the wakeup register bit 324 and any bus wakeup event that has been detected by clearing the enable register bit 302.

The output of the OR gate 322 is also supplied to NOR gate 326. The NOR gate 326 also receives like inputs from other bus ports that are supported by the computer system. In other words, for each of the bus ports provided in the computer system, the circuitry 302–324 is repeated. In any case, the output of the NOR gate 326 can serve as a wakeup request which directs the computer system to awaken the host bus controller.

In one embodiment, the wakeup request is a wakeup interrupt request (IRQ). Further, in one embodiment, the output of the NOR gate 326 can be supplied to a tri-sate buffer 328 which has a common collector output pulled to a high voltage source by a resistor 330. In one embodiment, the output of the tri-sate buffer 328 corresponds to a wakeup request (WKUP) that is able to initiate wakeup of the computer system.

The bus wakeup circuit 300 allows the computer system to detect a resume or connect event on the peripheral bus even though the host bus controller is shut down. While the bus wakeup controller may detect a disconnect event, such does not cause wakeup of the host bus controller because it is assumed that no action is needed given that the host bus controller is already shutdown. The bus wakeup circuit 300 requires only a small amount of circuitry and does not utilize a clock in its operation.

When enabled, the bus wakeup circuit 300 detects resume and connect events by detecting a rising edge on either of the data lines (VD + or VD−) and then setting the wakeup register bit 324 to "1" and signaling a wakeup request. The event so detected can be either a resume event or a connect event. Disconnect events are also detected when both data lines go low but such disconnect events do not lead to a wakeup. Namely, if both data lines go low, then the output of the OR gate 308 causes the flip-flops 310 and 312 (as well as the wakeup register bit 324) to be cleared. However, if either of the data lines later goes high, then the flip-flops 310 and 312 are again enabled and the same transition is used to clock the associated flip-flop(s) 310 or 312 with the help of the associated delay element(s) 316 or 320. Hence, the OR gate 308 is used to clear out any falsely detected rising edges due, for example, to noise during unplugging a connector from the bus port. The hardware or software reading the wakeup register bit 324 can further de-bounce the transient events in software, such as by re-sampling after a predetermined time interval.

The bus wakeup circuit 300 does not distinguish between resume and connect events. However, if the host bus controller is awakened quickly before the triggering event is gone, then the event will be properly handled by the host bus controller. Alternatively, even if the host bus controller is not awakened quickly, then software can usually determine the type of event. For example, if there were no peripheral devices connected to the bus when the host bus controller was placed in the inactive state, then the event would have to be a connect event.

Figure 4:
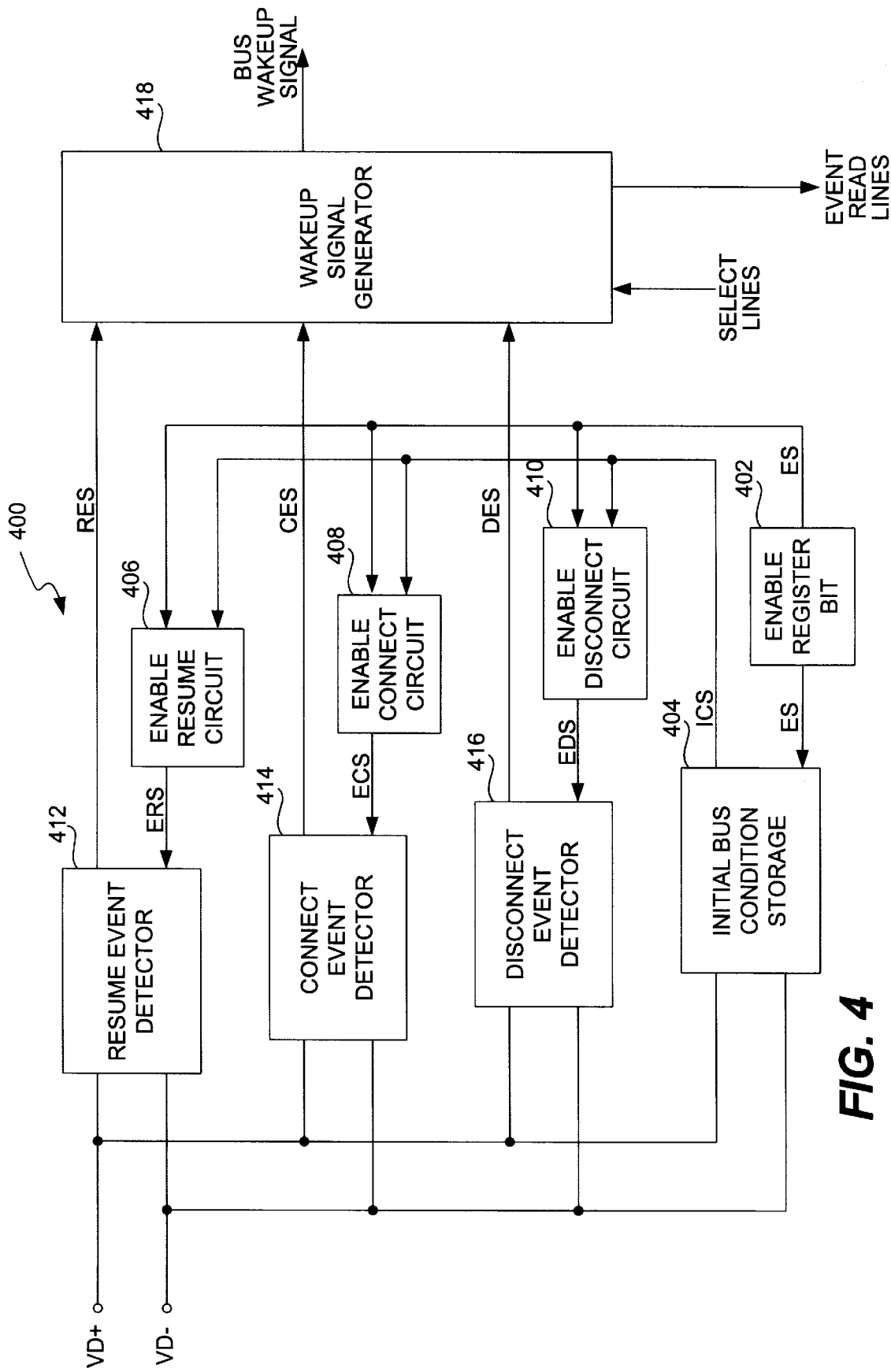
FIG. 4 is a block diagram of a bus wakeup circuit according to another embodiment of the invention.

FIG. 4 is a block diagram of a bus wakeup circuit 400 according to another embodiment of the invention. The bus wakeup circuit 400 is, for example, suitable for use as the USB wakeup circuit 118 illustrated in FIG. 1 or the USB wakeup circuit 222 illustrated in FIG. 2.

The bus wakeup circuit 400 is enabled by an enable register bit 402. When a "1" bit is stored in the enable register bit 402, the bus wakeup circuit 400 is generally activated (or enabled). An enable signal (ES) is provided by the enable register bit 402 and supplied to an initial bus condition storage 404 when a "1" bit is stored in the enable register bit 402, otherwise the bus wakeup circuit 400 is inactivated (or disabled) and the enable signal (ES) is not present. The initial bus condition storage 404 is coupled to the differential data lines VD+ and VD−. The enable signal (ES) is used to enable the bus wakeup circuit 400. When the enable signal (ES) is supplied to the initial bus condition storage 404, the initial bus condition storage operates to store the logic values on the data lines VD+ and VD− when the bus wakeup circuit 400 is activated. The initial bus condition storage 404 also outputs initial condition signals (ICS) that represent the values stored in the initial bus condition storage 404 to other circuitry of the bus wakeup circuit 400. In one embodiment, the initial condition signals (ICS) include an initial condition for the positive data line (IC+) and an initial condition for the negative data line (IC−).

The bus wakeup circuit 400 also includes an enable resume circuit 406, an enable connect circuit 408, and an enable disconnect circuit 410. The enable resume circuit 406, the enable connect circuit 408 and the enable disconnect circuit 410 all receive the enable signal (ES) from the enable register bit 402 and the initial condition signals (ICS) from the initial bus condition storage 404. The enable resume circuit 406, the enable connect circuit 408 and the enable disconnect circuit 410 are respectively associated with a resume event detector 412, a connect event detector 414 and a disconnect event detector 416.

The enable resume circuit 406 issues an enable resume signal (ERS) to the resume event detector 412 when the resume event detector 412 is to monitor the data lines VD+ and VD− to detect a resume event. When the resume event detector 412 determines that a resume event has been detected (after being enabled by the enable resume signal (ERS)), the resume event detector 412 issues a resume event signal (RES).

The enable connect circuit 408 issues an enable connect signal (ECS) to the connect event detector 414 when the connect event detector 414 is to monitor the data lines VD+ and VD− to detect a connect event. When the connect event detector 414 determines that a connect event has been detected (after being enabled by the enable connect signal (ECS)), the connect event detector 414 issues a connect event signal (CES).

The enable disconnect circuit 410 issues an enable disconnect signal (EDS) to the disconnect event detector 416 when the disconnect event detector 416 is to monitor the data lines VD+ and VD− to detect a disconnect event. When the disconnect event detector 416 determines that a disconnect event has been detected (after being enabled by the enable disconnect signal (EDS)), the disconnect event detector 416 issues a disconnect event signal (DES).

The bus wakeup circuit 400 also includes a wakeup signal generator 418. The wakeup signal generator 418 receives the resume event signal (RES), the connect event signal (CES) and the disconnect event signal (DES). Upon receiving these signals, the wakeup signal generator 418 determines whether a bus wakeup signal should be output from the wakeup signal generator 418. The bus wakeup signal, if output, is supplied to other circuitry within the computer system to cause the appropriate bus controller to be awakened. Additionally, the wakeup signal generator 418 can also receive select lines that allow the computer system to enable or disable each of the event signals (RES, CES and DES) from activating the bus wakeup signal. For example, the select lines could be used to disable the disconnect event signal (DES) from activating the bus wakeup signal, while enabling the resume event signal (RES) and the connect event signal (CES) for activating the bus wakeup signal. Still further, the wakeup signal generator 418 can also provide event read lines so that other components within the computer system are able to read the conditions of the various event signals being supplied to the wakeup signal generator 418. By reading these event signals, the other components within the computer system can determine if any of these particular types of events have occurred, regardless of whether a bus wakeup signal is actually generated.

Figure 5:
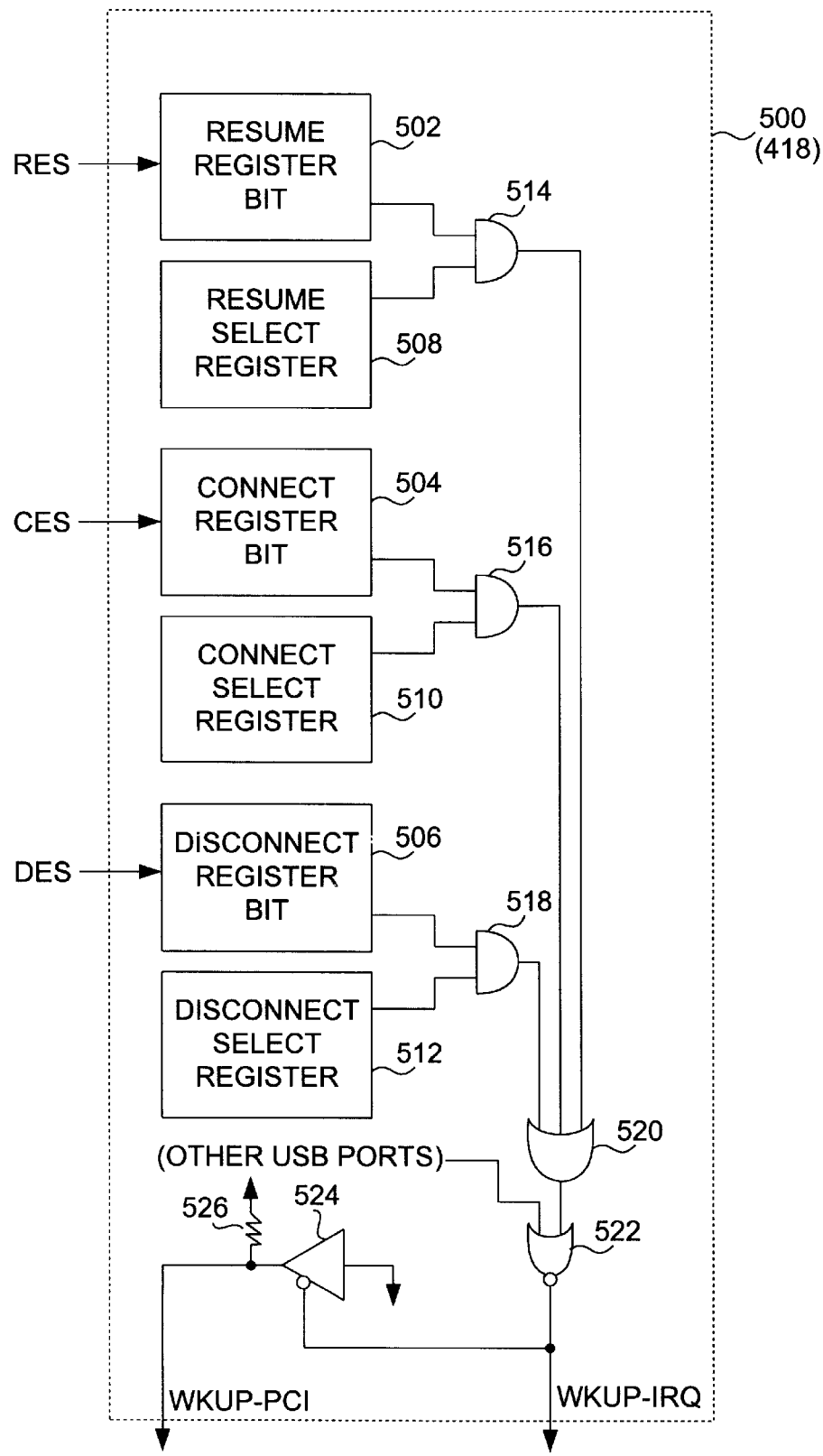
FIG. 5 is a schematic diagram of a wakeup signal generator according to one embodiment of the invention.

FIG. 5 is a schematic diagram of a wakeup signal generator 500 according to one embodiment of the invention. The wakeup signal generator 500 is, for example, suitable for use as the wakeup signal generator 418 illustrated in FIG. 4.

The wakeup signal generator 500 includes a resume register bit 502 that stores the resume event signal (RES), a connect register bit 504 that stores the connect event signal (CES), and a disconnect register bit 506 that stores the disconnect event signal (DES). The event read lines (FIG. 4) are connected to these registers 502–506 to allow the event signals stored therein to be read. The wakeup signal generator 500 also includes a resume select register 508, a connect select register 510, and a disconnect select register 512. In this embodiment, the select registers 508–512 store either a "0" bit or a "1" bit to indicate whether the associated event type is permitted to produce the bus wakeup signal.

The wakeup signal generator 500 also includes AND gates 514, 516 and 518. The AND gate 514 couples to the resume register bit 502 and the resume select register 508. Similarly, the AND gate 516 couples to the connect register bit 504 and the connect select register 510. Likewise, the AND gate 518 couples to the disconnect register bit 506 and the disconnect select register 512. As an example, when the resume register bit 502 stores a "1" to indicate that a resume event has occurred and the resume select register 508 also stores a "1" to indicate that resume events are to trigger the bus wakeup signal, the AND gate 514 outputs a "1" signal to indicate that a bus wakeup signal should be generated and output. The outputs from each of the AND gates 514–518 are supplied to OR gate 520 so that any one of which can generate the bus wakeup signal. The output of the OR gate 520 is supplied to a NOR gate 522. The NOR gate 522 also receives similar inputs from similar circuitry associated with other bus ports supported by the computer system. Hence, any of these bus ports is able to trigger the bus wakeup signal. The output of the NOR gate 522 is a wakeup interrupt signal (WKUP-IRQ) that initiates a wakeup sequence using an interrupt. The wakeup interrupt signal (WKUP-IRQ) is one type of interrupt signal. The output of the NOR gate 522 is also supplied to a tri-state buffer 524 having a common-collector output pulled to a positive voltage source by a resistor 526. The output of the buffer 524 provides a wakeup PCI signal (WKUP-PCI) which is another type of bus wakeup signal. In this embodiment, the wakeup PCI signal (WKUP-PCI) can be used to notify a power manager to wakeup the microprocessor (from a sleep mode) and then activate the USB host controller to support the USB bus.

Figure 6A:
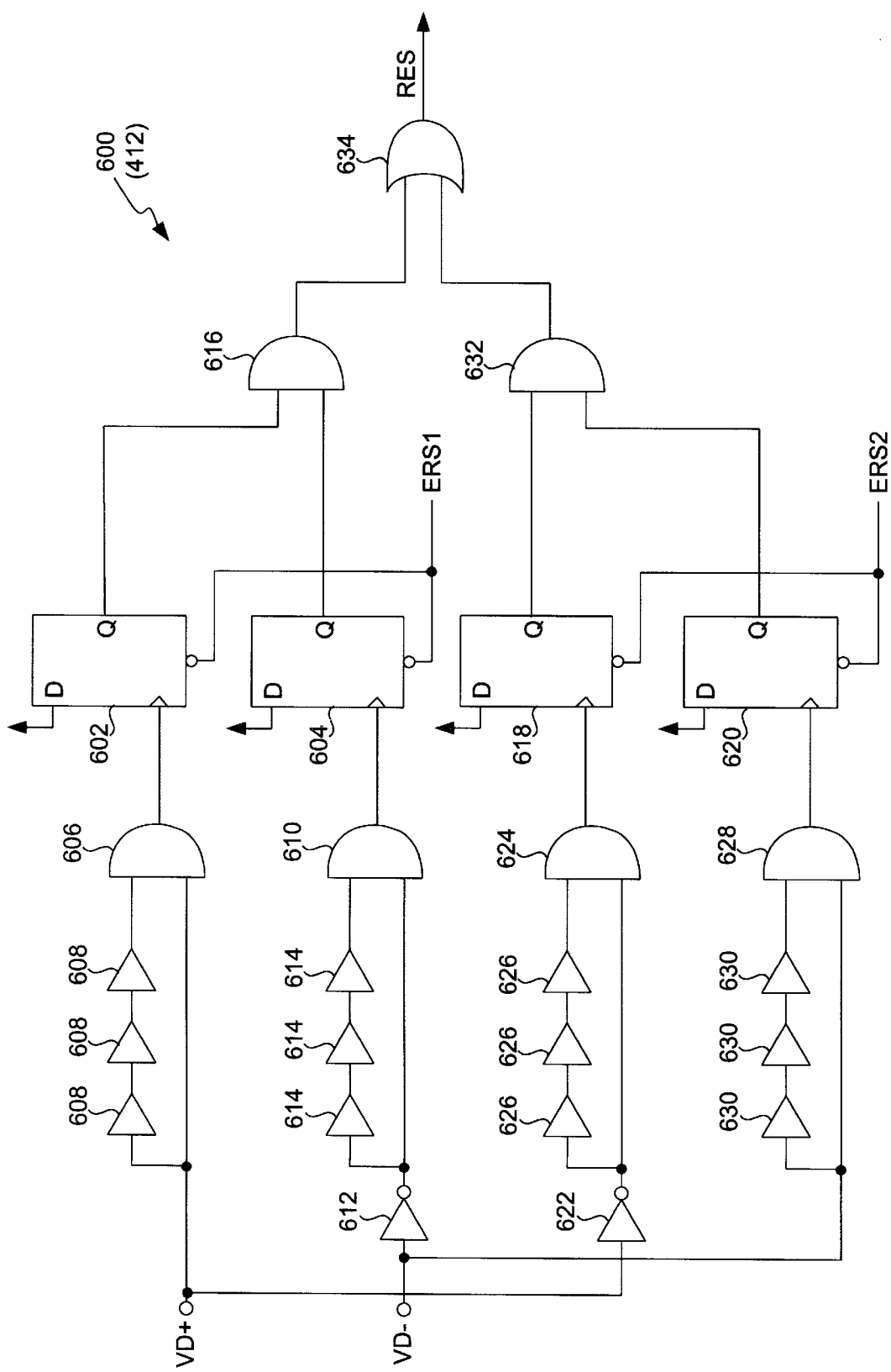
FIG. 6A is a schematic diagram of a resume event detector according to one embodiment of the invention.

FIG. 6A is a schematic diagram of a resume event detector 600 according to one embodiment of the invention. The resume event detector 600 is, for example, suitable for use as the resume event detector 412 illustrated in FIG. 4.

The resume event detector 600 includes a first pair of flip-flops 602 and 604. The flip-flops 602 and 604 receive a first enable resume signal (ERS1) at a reset terminal (or enable terminal). The flip-flops 602 and 604 also include a data terminal (D), a clock terminal, and an output terminal (Q). The data terminals (D) of the flip-flops 602 and 604 are coupled to a positive voltage source. The clock terminal of the flip-flop 602 receives the output from AND gate 606. A first input to the AND gate 606 is the positive data line (VD+). A second input to the AND gate 606 is a delayed version of the positive data line (VD+), where the delay is provided by a series of buffers 608. The clock terminal for the flip-flop 604 receives the output from AND gate 610. A first input to the AND gate 610 is supplied by an inverter 612 which inverts the negative data line (VD−). The second input to the AND gate 610 is a delayed version of the output of the inverter 612, where the delay is provided by a series of buffers 614. The series of buffers 608 and 614 together with the respective AND gates 606 and 610 provide a hardware de-bounce operation (i.e., noise resistance) to help reduce false detections that might otherwise be caused by momentary glitches and noise. The output terminals from the flip-flops 602 and 604 are provided as inputs to AND gate 616. The output of the AND gate 616 thus indicates whether a resume event has occurred due to the positive data line (VD+) transitioning high and the negative data line (VD−) transitioning low.

The resume event detector 600 also includes a second pair of flip-flops 618 and 620. The flip-flops 618 and 620 receive a second enable resume signal (ERS2) at a reset terminal (or enable terminal). The flip-flops 618 and 620 also include a data terminal (D), a clock terminal, and an output terminal (Q). The data terminals (D) of the flip-flops 618 and 620 are coupled to a positive voltage source. The clock terminal of the flip-flop 618 receives the output from AND gate 624. A first input to the AND gate 624 is supplied by an inverter 622 which inverts the positive data line (VD+). A second input to the AND gate 624 is a delayed version of the output of the inverter 622, where the delay is provided by a series of buffers 626. The clock terminal for the flip-flop 620 receives the output from AND gate 628. A first input to the AND gate 628 is the negative data line (VD−). The second input to the AND gate 628 is a delayed version of the negative data line (VD−), where the delay is provided by a series of buffers 630. The series of buffers 626 and 630 together with the respective AND gates 624 and 628 provide a hardware de-bounce operation (i.e., noise resistance) to help reduce false detections that might otherwise be caused by momentary glitches and noise. The output terminals from the flip-flops 618 and 620 are provided as inputs to AND gate 632. The output of the AND gate 632 thus indicates whether a resume event has occurred due to the positive data line (VD+) transitioning low and the negative data line (VD−) transitioning high.

Still further, the resume event detector 600 also includes OR gate 634. The OR gate 634 logically ORs the output from the AND gates 616 and 632. The output of the OR gate is the resume event signal (RES). Thus, the resume event detector 600 is able to detect a resume event occurring on the bus having the positive data line (VD+) and the negative data line (VD−). Hence, the resume event detector 600 is particularly well suited for use with a USB bus that includes a pair of differential lines, including the positive data line (VD+) and the negative data line (VD−).

Figure 6B:
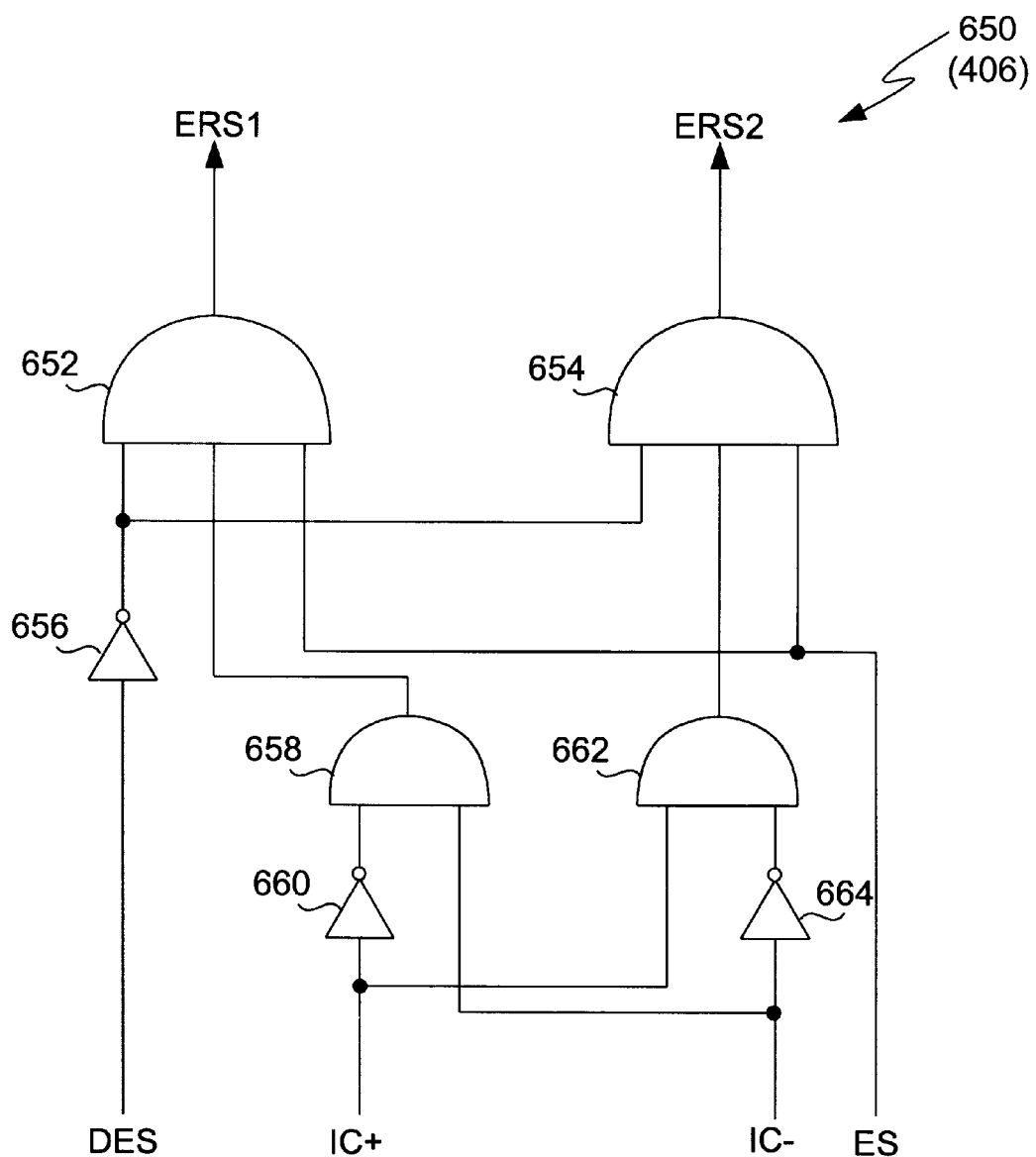
FIG. 6B is a schematic diagram of an enable resume circuit according to one embodiment of the invention.

FIG. 6B is a schematic diagram of an enable resume circuit 650 according to one embodiment of the invention. The enable resume circuit 650 is, for example, suitable for use as the enable resume circuit 406 illustrated in FIG. 4. The enable resume circuit 650 serves to enable the resume event detector 600, or portions thereof, at appropriate times. By enabling only limited portions of the resume event detector 600 based on the initial condition signals (ICS), false events are less likely to be triggered. In this manner, the resume event detector 600 detects events based on reversal of levels on the data lines as compared to the initial conditions. Also, resume event detector 600 is completely disabled when no peripheral devices are connected to the bus when the bus wakeup circuit is activated; hence, noise associated with connection of a peripheral device does not falsely generate resume events.

The enable resume circuit 650 produces the first enable resume signal (ERS1) and the second enable resume signal (ERS2). These enable resume signals are utilized by the resume event detector 600 illustrated in FIG. 6A. Specifically, the first enable resume signal (ERS1) enables the flip-flops 602 and 604 when the positive data line (VD+) has initial condition (IC+) of LOW and the negative data line (VD−) has an initial condition (IC−) of HIGH. On the other hand, the second enable resume signal (ERS2) enables the flip-flops 618 and 620 when positive data line (VD+) has an initial condition (IC+) of HIGH and negative data line (VD−) has an initial condition (IC−) of LOW. Hence, the first and second resume enable signals (ERS1) and (ERS2) are used to enable only the portion of the resume event detector 600 to detect resume events of opposite polarity from the initial conditions, and thus helps avoid false resume events.

The first enable resume signal (ERS1) is supplied by AND gate 652, and t he second enable resume signal (ERS2) is supplied by AND gate 654. One input to the AND gates 652 and 654 is the enable signal (ES). Another input to the AND gates 652 and 654 is an inverted version of the disconnect event signal (DES). This disables (clears) the resume detection by the resume event detector 600 when a disconnect event is detected which prevents false reporting of resume events due to disconnection noise. The inversion of the disconnect event signal (DES) is provided by an inverter 656. A third input to the AND gate 652 is provided by AND gate 658. The inputs to the AND gate 658 include the negative initial condition (IC−) and an inverted version of the positive initial condition (IC+). The inversion of the positive initial condition (IC+) is provided by an inverter 660. A third input to the AND gate 654 is provided by AND gate 662. The inputs to the AND gate 662 include the positive initial condition (IC+) and an inverted version of the negative initial condition (IC−). The inversion of the negative initial condition (IC−) is provided by an inverter 664.

Figures 7A, 7B:
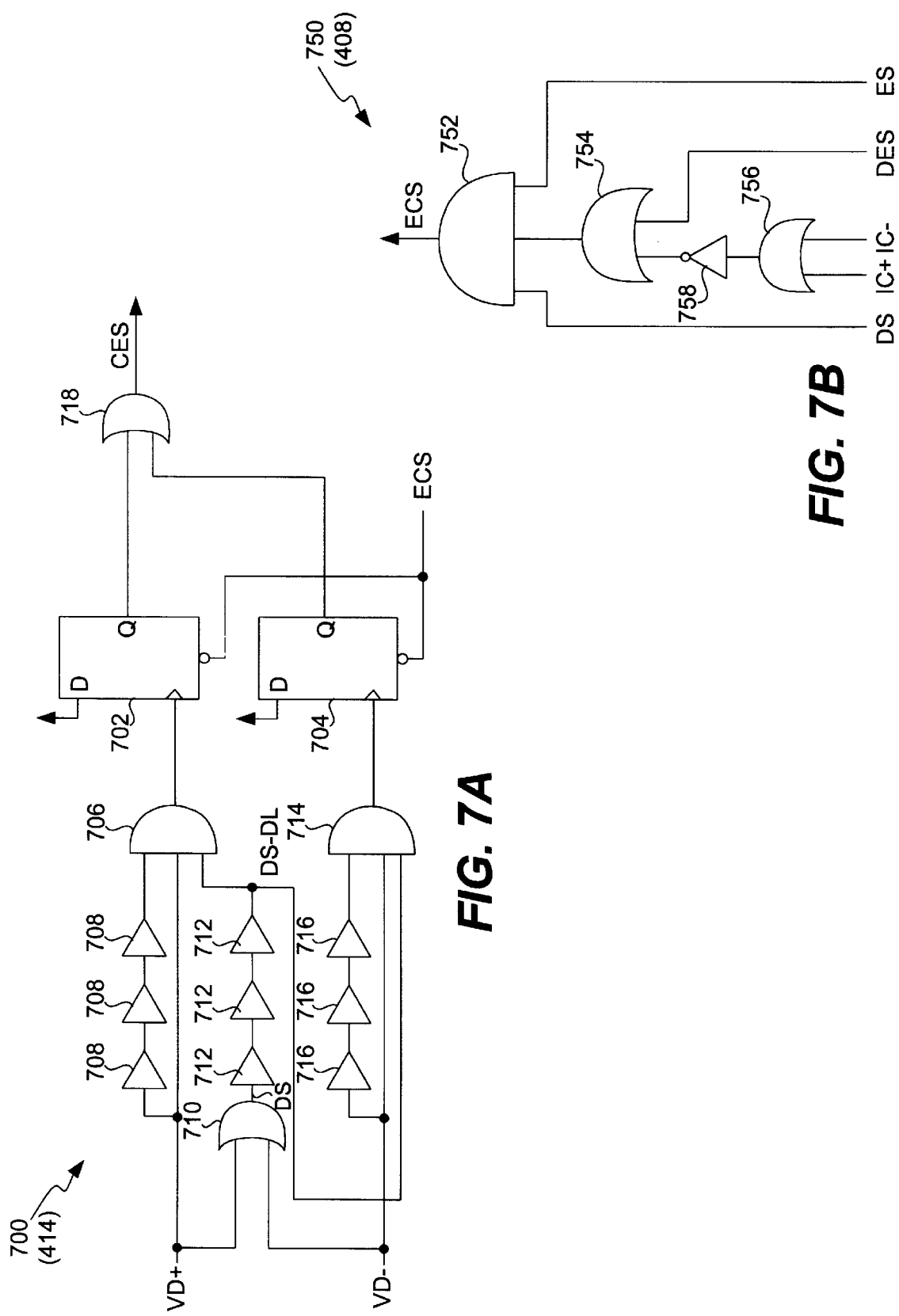
FIG. 7A is a schematic diagram of a connect event detector according to one embodiment of the invention.
FIG. 7B is a schematic diagram of an enable connect circuit according to one embodiment of the invention.

FIG. 7A is a schematic diagram of a connect event detector 700 according to one embodiment of the invention. The connect event detector 700 is, for example, suitable for use as the connect event detector 414 illustrated in FIG. 4.

The connect event detector 700 includes flip-flops 702 and 704. Each of the flip-flops 702 and 704 include a data terminal (D), a clock terminal, an enable terminal, and an output terminal (Q). The enable terminals of the flip-flops 702 and 704 receive an enable connect signal (ECS). The enable connect signal (ECS) is provided by the enable connect circuit 408 illustrated in FIG. 4. The data terminals (D) of the flip-flops 702 and 704 are coupled to a positive voltage source. The clock terminal for the flip-flop 702 receives the output from AND gate 706. The AND gate 706 receives three inputs. A first input to the AND gate 706 is the positive data line (VD+). The second input to the AND gate 706 is a delayed version of the positive data line (VD+) to provide noise resistance, where the delay is provided by a series of buffers 708. The third input to the AND gate 706 is a delayed disconnect signal (DS-DL). The delayed disconnect signal (DS-DL) is utilized to block the triggering of the flip-flop 702 or the flip-flop 704 if a disconnect event appears on the data lines. In other words, OR gate 710 logically ORs the positive data line (VD+) and the negative data line (VD−) such that the output of the OR gate 710 is the disconnect signal which is LOW only when both the positive and negative data lines (VD+ and VD−) are LOW. The output of the OR gate 710, after being delayed by a series of buffers 712, becomes the delayed disconnect signal (DS-DL) that is supplied to the AND gate 706 as the third input. The delayed disconnect signal (DS-DL) serves to allow the transition high on one of the data lines (VD+ and VD−) to provide a delayed edge to one of the AND gates 706 and 714 so that the flip-flops are enabled when the delayed edge arrives at the clock input to the flip-flops 702 and 704 (see also FIG. 7B). The disconnect signal (DS) also clears out any falsely detected connect events (see FIG. 7B). The clock terminal for the second flip-flop 704 receives the output from AND gate 714. The AND gate 714 receives three inputs. A first input to the AND gate 714 is the negative data line (VD−). The second input to the AND gate 714 is a delayed version of the negative data line (VD−) to provide noise resistance, where the delay is provided by a series of buffers 716. The third input for the AND gate 714 is the delayed disconnect signal (DS-DL) mentioned above. The output terminals of the flip-flops 702 and 704 are coupled to inputs of an OR gate 718. The output of the OR gate 718 is the connect event signal (CES).

FIG. 7B is a schematic diagram of an enable connect circuit 750 according to one embodiment of the invention. The enable connect circuit 750 is, for example, suitable for use as the enable connect circuit 408 illustrated in FIG. 4.

The enable connect circuit 750 produces the enable connect signal (ECS) that is used to enable operation of the connect event detector 414, 700. The enable connect signal (ECS) is produced by AND gate 752. The AND gate 752 receives three inputs. A first input to the AND gate 752 is the disconnect signal (DS) mentioned above with respect to FIG. 7A and serves to disable the connect event detector 414, 700 and thus to clear out any falsely detected rising edges (i.e., connect events) due, for example, to noise during unplugging a connector from the bus port. The disconnect signal (DS) only disables (clears) the connect event detector 414, 700 while both the initial condition positive (IC+) and the initial condition negative (IC−) are low. A second input to the AND gate 752 is the enable signal (ES) such as provided by the enable register bit 402 illustrated in FIG. 4.

A third input to the AND gate 752 is provided by the output of OR gate 754. The OR gate 754 receives the disconnect event signal (DES) as a first input. An OR gate 756 logically ORs the initial condition positive (IC+) and the initial condition negative (IC−). The output of the OR gate 756 is then inverted by an inverter 758. The OR gate 754 receives the output of the inverter 758 as a second input. Hence, the enable connect signal (ECS) only enables the connect event detector 700 when the disconnect event occurs or when the initial conditions are of a disconnected state.

Figure 8A:
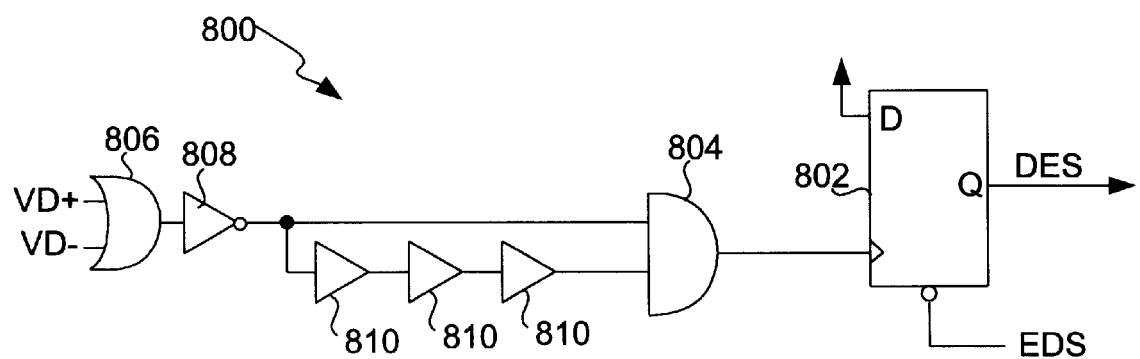
FIG. 8A is a schematic diagram of a disconnect event detector according to one embodiment of the invention.

FIG. 8A is a schematic diagram of a disconnect event detector 800 according to one embodiment of the invention. The disconnect event detector 800 is, for example, suitable for use as the disconnect event detector 416 illustrated in FIG. 4.

The disconnect event detector 800 includes a flip-flop 802. The flip-flop 802 includes a data terminal (D), a clock terminal, a reset (or enable) terminal, and an output terminal (Q). The data terminal (D) is coupled to a positive voltage source, and the reset terminal receives the enable disconnect signal (EDS). The enable disconnect signal (EDS) is provided by the enable disconnect circuit 410 illustrated in FIG. 4. The clock terminal receives the output from an AND gate 804. A first input to the AND gate 804 is supplied by OR gate 806 and an inverter 808. The OR gate 806 logically ORs the signals on the positive data line (VD+) with those on the negative data line (VD−). The output of the OR gate 806 is then inverted by the inverter 808 and supplied to the AND gate 804 as the first input. The output of the inverter 808 is also delayed by a series of buffers 810 then supplied to the AND gate 804 as a second input. The delay provided by the series of buffers 810 is preferably at least 210 ns for a USB bus so that resume events are not falsely detected as disconnect events. The output of the flip-flop 802 is the disconnect enable signal (DES).

Figure 8B:
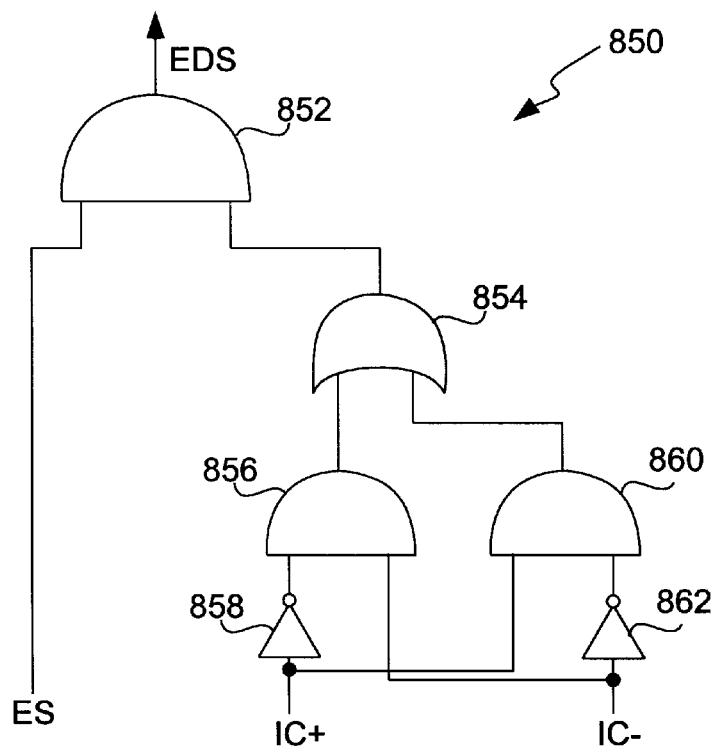
FIG. 8B is a schematic diagram of an enable disconnect circuit according to one embodiment of the invention.

FIG. 8B is a schematic diagram of an enable disconnect circuit 850 according to one embodiment of the invention. The enable disconnect circuit 850 is, for example, suitable for use as the enable disconnect circuit 410 illustrated in FIG. 4.

The enable disconnect circuit 850 produces the enable disconnect signal (EDS) that is used to enable the disconnect event detector 416, 800. The enable disconnect circuit 850 includes AND gate 852 that outputs the enable disconnect signal (EDS). A first input to AND gate 852 is the enable signal (ES) which can be provided by the enable register bit 402 illustrated in FIG. 4. A second input to the AND gate 852 is provided by the output from OR gate 854. A first input to OR gate 854 is supplied by AND gate 856, and a second input to OR gate 854 is supplied by the output of AND gate 860. The AND gate 856 receives the initial condition negative (IC−) as a first input, and receives an inverted version of the initial condition positive (IC+) as a second input. The inversion of the initial condition positive (IC+) is provided by an inverter 858. On the other hand, AND gate 860 receives the initial condition positive (IC+) as a first input, and receives an inverted version of the initial condition negative (IC−) as a second input. The inversion of the initial condition negative (IC−) is provided by an inverted 862. The disconnect event detector 800 is enabled by the enable disconnect circuit 850 when the initial conditions indicate an idle state.

The invention uses various techniques to avoid detection of false events. The initial conditions stored when the bus wakeup circuit is activated are used to limit the particular events to be detected. This allows the bus wakeup circuit to more reliably detect valid events. Namely, if both data lines are initially low, indicating that no peripheral devices are connected to the bus, then only connect events are to be detected. Hence, in this case, resume and disconnect detectors are disabled. Also, if one line is low and the other high initially, indicating the bus is in a suspend state, then only resume and disconnect events are detected. Thus, in this case, the connect detector is disabled when the initial conditions indicate an idle (or suspend) state. Further, with resume events, the detection can be limited to transitions in the appropriate directions given the initial levels on the data lines.

Although the various enable circuits for the particular bus event detectors have been described separately, it should be recognized that all the specific enable circuits could be combined into a general enable circuit. In any case, portions of the circuitry of the enable circuits is able to be shared in certain cases to reduce needed circuitry. For example, the AND gates 658 and 653 and the inverters 660 and 664 of the enable resume circuit 650 shown in FIG. 6B can also be used as the AND gates 856 and 860 and the inverters 858 and 862 of the enable disconnect circuit 850. As another example, the OR gate 806 of the disconnect event detector 800 can also be used as the OR gate 710 of the connect event detector 700.

Figure 9:
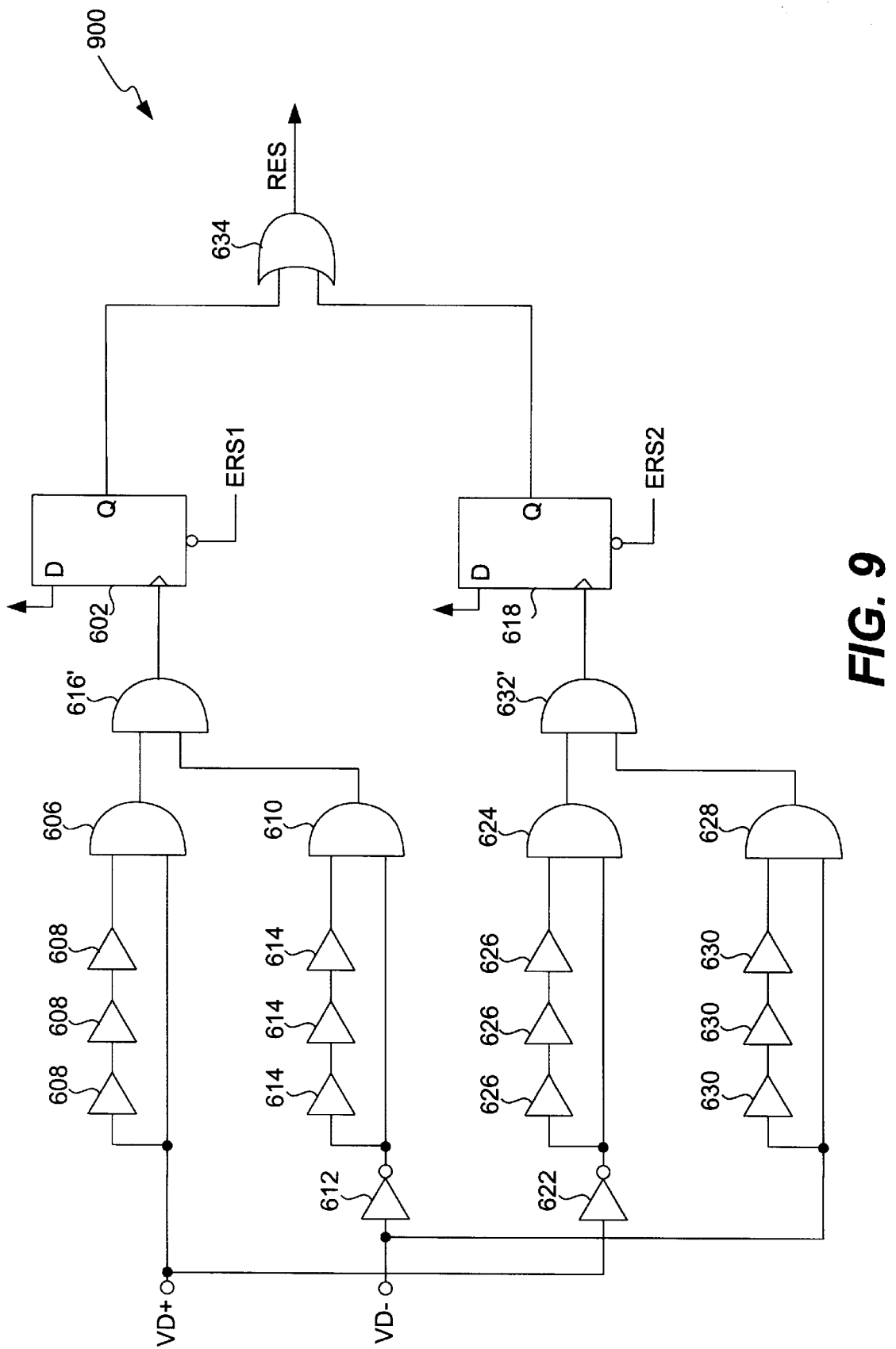
FIG. 9 is a schematic diagram of a resume event detector according to another embodiment of the invention.

FIG. 9 is a block diagram of a schematic diagram of a resume event detector 900 according to another embodiment of the invention. The resume event detector 900 is, for example, suitable for use as the resume event detector 412 illustrated in FIG. 4. The resume event detector 900 represents a variant of the resume event detector 600 illustrated in FIG. 6A in which flip-flops 604 and 620 are not required and in which the AND gates 616' and 632' are effectively placed before the remaining flip-flops 602 and 618. The advantages of the resume event detector 900 include less circuitry and possibly some additional noise immunity in the detection of resume events.

Still another embodiment of the bus wakeup circuit (e.g., the bus wakeup circuit 222) operates to detect events on the bus while the host bus controller is in the inactive state. Once an event that requires wakeup is detected, the wakeup is initiated and the bus state associated with the detected event is driven on the bus. Hence, when the host bus controller awakens it reads the bus event directly from the bus. Thereafter, the bus wakeup circuit stops driving the bus event onto the bus. Here, the detection of a resume state would trigger wakeup and cause the resume event to be driven on the bus. However, with connect and disconnect events, the bus host controller is likely able to awaken before these states are no longer present on the bus.

Although the event detectors discussed above use a hardware de-bounce to avoid spurious event detection due to momentary glitches or noise, alternative or additional de-bounce can be provided in software by re-sampling event registers after a predetermined time interval. The bus wakeup circuit according to the invention could also be incorporated into the host bus controller or other components and thus need not be separate circuitry.

The invention can use a combination of hardware and software components. The software can be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. Different embodiments or implementations may have one or more of the following advantages. One advantage of the invention is that bus events invoked on a bus by a peripheral device are able to be noticed and responded to even though bus circuitry (e.g., host bus controller) is shut down (i.e., inactive state). As such, bus events are able to be detected without use of the host bus controller for the bus. Certain embodiments of the invention do not require a clock, such as the host bus controller's clock, thus detection of bus events can occur while the host bus controller (and its clock) are shutdown. Another advantage of the invention is that power management can be had for bus circuitry without loss of important bus events while the bus circuitry is shut down. Still another advantage of the invention is that resistance to noise present on the bus is provided so that bus events are not erroneously detected. Yet another advantage of the invention is that the particular type of event inducing the awakening of the bus circuitry can be made known to the computer system (e.g., operating system).

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer system, comprising:
   a memory for storing at least instructions;
   a microprocessor for processing the instructions stored in said memory;
   a peripheral bus;
   a bus host controller for managing data transfer over said peripheral bus, said bus host controller having an operational mode and a shut-down mode, the shut-down node providing power savings; and
   a wakeup circuit operatively connected to said peripheral bus, said wakeup circuit operates to detect bus events on said peripheral bus when said bus host controller is in the shut-down mode and to initiate awakening of said bus host controller to the operational mode when bus events have been detected,
   wherein said wakeup circuit couples to first and second data lines of said USB bus, and
   wherein said peripheral bus is a USB bus, and wherein said bus host controller is a USB bus host controller.

2. A computer system as recited in claim 1 wherein said wakeup circuit initiates an interrupt to awaken said bus host controller.

3. A computer system as recited in claim 1, wherein said bus host controller is placed in the shut-down mode when said computer system is in a sleep state or when no peripheral devices are connected to said peripheral bus.

4. A computer system as recited in claim 1,
   wherein said microprocessor has an active state and a sleep state,
   wherein said computer system further comprises:
     an operating system that controls whether said microprocessor is in the active state or the sleep state, and wherein when said microprocessor is in the sleep state, said wakeup circuit initiates wakeup of said microprocessor which then awakens said bus host controller.

5. A computer system as recited in claim 1, wherein the bus events detected by said wakeup circuit include one or more of a resume event, a connect event and a disconnect event.

6. A computer system, comprising:
a memory for storing at least instructions;
a microprocessor for processing the instructions stored in said memory;
a peripheral bus;
a bus host controller for managing data transfer over said peripheral bus, said bus host controller having an operational mode and a shut-down mode, the shut-down mode providing power savings; and
a wakeup circuit operatively connected to said peripheral bus, said wakeup circuit operates to detect bus events on said peripheral bus when said bus host controller is in the shut-down mode and to initiate awakening of said bus host controller to the operational mode when bus events have been detected,
wherein said wakeup circuit comprises:
an initial bus condition store that stores initial conditions on said peripheral bus when said wakeup circuit is activated; and
at least one event detector that detects at least one type of bus event on said peripheral bus based on changes on said peripheral bus as compared to the initial conditions.

7. A computer system, comprising:
a memory for storing at least instructions;
a microprocessor for processing the instructions stored in said memory;
a peripheral bus;
a bus host controller for managing data transfer over said peripheral bus, said bus host controller having an operational mode and a shut-down mode, the shut-down mode providing power savings; and
a wakeup circuit operatively connected to said peripheral bus, said wakeup circuit operates to detect bus events on said peripheral bus when said bus host controller is in the shut-down mode and to initiate awakening of said bus host controller to the operational mode when bus events have been detected,
wherein said wakeup circuit comprises:
an initial bus condition store that stores initial conditions residing on said peripheral bus when said wakeup circuit is activated;
an event detector that detects at least one type of bus event on said peripheral bus; and
an enable circuit coupled to said initial bus condition store and said event detector, said enable circuit enables operation of said event detector based at least in part on the initial conditions stored in said initial bus condition store.

8. A computer system as recited in claim 7, wherein the at least one type of bus event is selected from the group consisting of a resume event, a connect event, and a disconnect event.

9. A computer system as recited in claim 8, wherein said peripheral bus is a USB bus, and wherein said bus host controller is a USB bus host controller.

10. A wakeup circuit for awakening a bus controller from a low-power mode, the bus controller controls communications with a bus, said wakeup circuit comprising:

an initial bus condition store that stores initial conditions residing on the bus when said wakeup circuit is activated; and
event detection circuitry that detects at least one type of bus event on the bus based on current bus conditions and the initial conditions stored in said initial bus condition store.

11. A wakeup circuit as recited in claim 10, wherein said wakeup circuit further comprises:
a wakeup signal generator operatively connected to said event detection circuitry, said wakeup signal generator operates to produce a bus wakeup signal that is used in awakening the bus controller.

12. A wakeup circuit as recited in claim 10, wherein said event detection circuitry comprises:
at least one event detector that detects at least one type of bus event on the bus; and
an enable circuit coupled to said initial bus condition store and said at least one event detector, said enable circuit enables operation of said at least one event detector based at least in part on the initial conditions stored in said initial bus condition store.

13. A wakeup circuit as recited in claim 12, wherein the at least one type of bus event is selected from the group consisting of a resume event, a connect event, and a disconnect event.

14. A wakeup circuit as recited in claim 13, wherein the bus is a USB bus.

15. A wakeup circuit as recited in claim 10, wherein said event detection circuitry comprises:
a resume event detector that detects a resume bus event on the bus;
a connect event detector that detects a connect bus event on the bus; and
an enable circuit coupled to said initial bus condition store, said resume event detector and said connect event detector, said enable circuit enables operation of each of said resume event detector and said connect event detector based at least in part on the initial conditions stored in said initial bus condition store.

16. A wakeup circuit for awakening a bus controller from a low-power mode, the bus controller controls communications with a bus, said wakeup circuit comprising:
event detection circuitry that detects at least one type of bus event on the bus based on current bus conditions; and
a wakeup signal generator operatively connected to said event detection circuitry, said wakeup signal generator operates to produce a bus wakeup signal that is used in awakening the bus controller,
wherein said event detection circuitry comprises a detected event store that stores the detected bus event, and
wherein system software that controls the bus controller is able to access the detected event store to identify the detected bus event.

17. A wakeup circuit as recited in claim 16, wherein the at least one type of bus event is one of a resume event or a connect event.

18. A wakeup circuit as recited in claim 16, wherein the bus is a USB bus.

19. A wakeup circuit as recited in claim 16, wherein said wakeup circuit further comprises:
a bus state drive circuit operatively connected to event detection circuitry and the bus, said bus state drive circuit operates to drive a bus state onto the bus when said event detection circuitry detects the at least one type of bus event on the bus, the bus state pertaining to the detected bus event.

20. A method for monitoring bus activity on a bus of a computing device when a bus controller for the bus is inactive, said method comprising:

(a) activating a bus monitor circuit when the bus controller becomes inactive;

(b) saving an initial bus state when the bus monitor circuit is activated;

(c) subsequently monitoring a current bus state of the bus using the bus monitor circuit to detect certain bus events occurring on the bus, the certain bus events being detected based on the initial bus state and the current bus state; and (d) awakening the bus controller when at least one of the certain bus events are detected.

21. A method as recited in claim 20, wherein the bus is a USB bus having a pair of data lines, wherein the initial bus state pertains to signals on the pair of data lines when the bus monitor circuit is activated, and wherein the current bus state pertains to signals currently on the pair of data lines.

22. A method as recited in claim 20, wherein the initial bus state limits the certain bus events that are detected to awaken the bus controller.

23. A method as recited in claim 20, wherein the initial bus state pertains to signals on the pair of data lines when the bus monitor circuit is activated, and wherein the current bus state pertains to signals currently on the pair of data lines.

24. A method as recited in claim 23, wherein the initial bus state limits the certain bus events that are detected to awaken the bus controller.

25. A method as recited in claim 20, wherein the bus is a USB bus.

26. A method as recited in claim 20, wherein the computing device is a personal computer.

27. A bus monitoring apparatus for monitoring bus activity on a bus of a computing device when a bus controller for the bus is inactive, said apparatus comprising:

means for activating said bus monitoring apparatus when the bus controller becomes inactive;

means for saving an initial bus state when said bus monitoring apparatus is activated;

means for subsequently monitoring a current bus state of the bus using said bus monitoring apparatus to detect certain bus events occurring on the bus, the certain bus events being detected based on the initial bus state and the current bus state; and means for initiating awakening the bus controller when at least one of the certain bus events are detected by said bus monitoring apparatus.

* * * * *